United States Patent [19]

Borlinghaus

[11] Patent Number: 4,993,747
[45] Date of Patent: Feb. 19, 1991

[54] ELECTRO-RHEOLOGICAL BELT LOAD ANCHORAGE MECHANISM

[75] Inventor: Hans J. Borlinghaus, Mt. Clemens, Mich.

[73] Assignee: General Motors Corporation, Detroit, Mich.

[21] Appl. No.: 495,007

[22] Filed: Mar. 12, 1990

[51] Int. Cl.$^5$ ............................................. B60R 22/36
[52] U.S. Cl. .................................. 280/806; 188/267; 280/807
[58] Field of Search ....................... 280/801, 806, 807; 180/268

[56] References Cited

U.S. PATENT DOCUMENTS

| | | | |
|---|---|---|---|
| 3,871,470 | 3/1975 | Schwanz et al. | 280/806 |
| 4,239,260 | 12/1980 | Hollowell | 280/806 |
| 4,260,178 | 4/1981 | Kluting | 280/806 |
| 4,473,242 | 9/1984 | Weman | 280/806 |
| 4,815,674 | 3/1989 | Blake et al. | 188/267 |

Primary Examiner—Kenneth R. Rice
Attorney, Agent, or Firm—Charles E. Leahy

[57] ABSTRACT

A vehicle seat is mounted on the vehicle body by a seat adjuster which enables movement of the seat relative to the vehicle body to a position chosen by the occupant. A seat belt is anchored on the seat so that the seat belt moves with the seat to the adjusted position. An extensible cylinder extends from the vehicle floor to the seat belt anchor on the seat and extends and retracts as necessary to accommodate the adjusting movement of the seat. The extensible cylinder includes a piston movable within a chamber filled with electro-rheological fluid. During adjusting movement of the seat, electrical voltage is interrupted to the electro-rheological fluid to liquefy the fluid for flow through orifices in the piston, so that the cylinder may extend and retract to follow the seat. At all other times, voltage is applied to the electro-rheological fluid so that the fluid solidifies and is unable to flow through the orifices so that the piston is locked within the cylinder and the occupant restraint load is transmitted from the seat belt to the floor.

3 Claims, 2 Drawing Sheets

ELECTRO-RHEOLOGICAL BELT LOAD ANCHORAGE MECHANISM

FIELD OF THE INVENTION

The invention relates to a seat belt mounted on a vehicle seat and more particularly provides a cylinder filled with electro-rheological fluid for transferring the occupant restraint load to the vehicle floor.

BACKGROUND OF THE INVENTION

It is known to provide a motor vehicle seat mounted on the floor by a seat adjusting mechanism so that the seat can be adjusted fore and aft and up and down to adjust the occupant seating position.

It is also known to provide an occupant restraint belt for restraining an occupant in the vehicle seat. It has been recognized in the prior art as desirable to mount the seat belt directly on the seat so that the belt travels with the seat during adjusting movement of the seat. The prior art has also provided load transfer mechanisms acting between the seat belt anchorage on the seat and the vehicle floor to transmit the occupant restraint load directly to the floor rather than transmitting the occupant restraint load through the seat adjusting mechanism.

The present invention provides a new and improved seat belt load transfer mechanism comprised of an extensible cylinder filled with electro-rheological fluid and acting between the floor and the seat belt anchorage to transmit the occupant restraining load.

SUMMARY OF THE INVENTION

According to the invention a vehicle seat is mounted on the vehicle body by a seat adjuster which enables movement of the seat relative to the vehicle body to a position chosen by the occupant. A seat belt is anchored on the seat so that the seat belt moves with the seat to the adjusted position. An extensible cylinder extends from the vehicle floor to the seat belt anchor on the seat and extends and retracts as necessary to accommodate the adjusting movement of the seat. The extensible cylinder includes a piston movable within a chamber filled with electro-rheological fluid. During adjusting movement of the seat, electrical voltage is not applied to the electro-rheological fluid to liquefy the fluid for flow through orifices in the piston, so that the cylinder may extend and retract to follow the seat. At all other times, voltage is applied to the electro-rheological fluid so that the fluid solidifies and is unable to flow through the orifices so that the piston is locked within the cylinder and the occupant restraint load is transmitted from the seat belt to the floor.

Accordingly, the object, feature and advantage of the invention resides in the provision of an extensible cylinder filled with electro-rheological fluid and acting between a seat belt and a vehicle floor to transmit occupant restraint loads from the seat to the vehicle floor.

Another feature object and advantage of the invention resides in the provision of an electro-rheological fluid-filled extensible cylinder acting between a seat mounted seat belt and the vehicle floor and having an electrical connection to the electric seat adjusting mechanism so that during energization of the seat adjuster voltage is not applied to the electro-rheological fluid to liquefy the electro-rheological fluid and permit fluid flow through piston orifices to permit extension and retraction of the cylinder.

BRIEF DESCRIPTION OF THE DRAWINGS

These and other features, objects and advantages of the invention will become apparent upon further consideration of the description of the preferred embodiment and reference to the appended drawings in which.

DESCRIPTION OF THE PREFERRED EMBODIMENT

Figure 1:
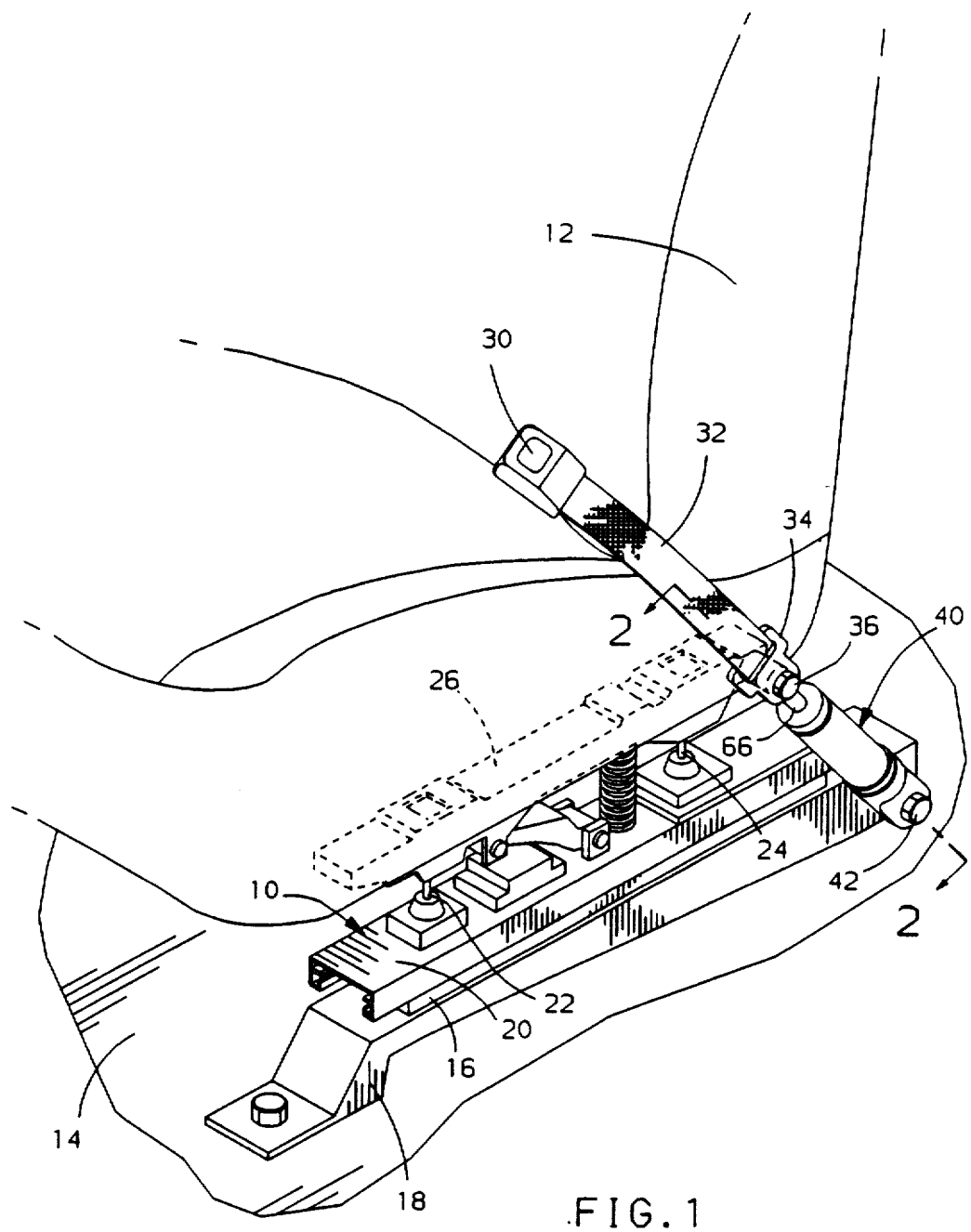
FIG. 1 is a perspective view of a vehicle seat mounted on the floor by a seat adjusting mechanism and having a seat belt carried by the seat and anchored to the floor by the extensible cylinder of this invention.

Referring to FIG. 1, it is seen that a seat adjuster mechanism generally indicated at 10, mounts a vehicle seat 12 on the vehicle floor 14. The seat adjuster 10 includes a lower track 16 mounted on the floor 14 by a floor bracket 18. An upper track 20 slideably engages the lower track 16 and is movable fore and aft relative the lower track 16 by a motor, not shown, to adjust the fore and aft position of the seat 12. The seat adjuster mechanism 10 also includes a front jack screw 22 and a rear jack screw 24 which respectively act between the upper track 20 and the forward and rearward ends of the seat frame attachment member 26 which mounts the seat to adjust the seat vertically.

The vehicle body also has a seat belt system including a buckle 30 connected to a belt 32 which is mounted on the seat frame 26 via anchor loop 34 and a bolt 36. The seat belt buckle 30 moves fore and aft and up and down with the seat to maintain a constant position relative the occupant irrespective of adjusting movement of the seat.

An extensible cylinder assembly, generally indicated at 40, has one end attached to the seat belt anchor loop 34 by the bolt 36 and the other end attached to the vehicle floor by bolt 42 at the rear leg of mounting bracket 18.

Figure 2:
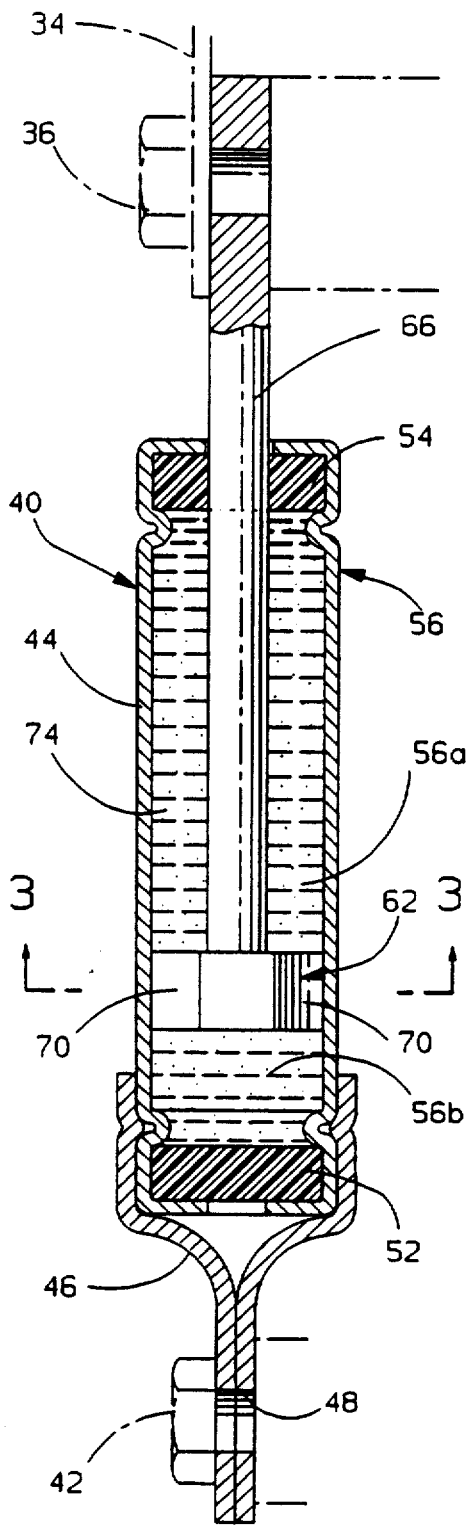
FIG. 2 is a section view taken in the direction of arrows 2—2 of FIG. 1.
Figure 3:
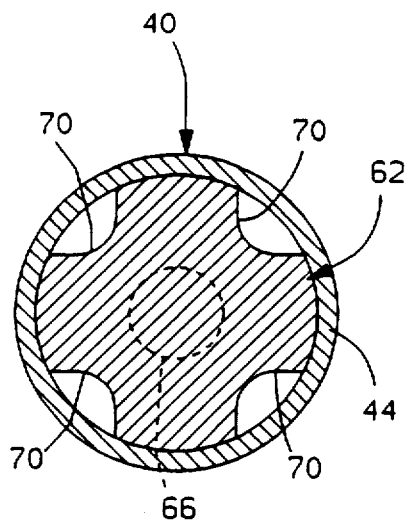
FIG. 3 is a section view taken in the direction of arrows 3—3 of FIG. 2.

Referring to FIG. 2 it is seen that the extensible cylinder assembly 40 is comprised of a cylinder 44 having its lower end swaged to a mounting bracket 46 having aperture 48 for receiving the bolt 42. A seal disc 52 is mounted at the lower end of the cylinder 44 and a seal disc 54 is mounted at the upper end of the cylinder 44 to define therewith a fluid chamber 56. A piston 62 is sealingly slideable within the cylinder 46 and has a rod 66 which extends through the seal disc 54. The piston 62 divides the chamber 56 into upper chamber 56a and lower chamber 56b. As best seen in FIGS. 2 and 3, the piston wall 62 has a plurality of valve orifices 70 which communicate fluid through the piston wall 62.

The chamber 56 is filled with an electro-rheological fluid. Such fluids are composed of porous solid particles suspended in a non mixing blend of oil and water. The porous solid particles are a polymerized monomer mixture finely ground into particles. In the inert state of the fluid, the particles absorb all the water and the particles are separated by oil.

Figure 4:
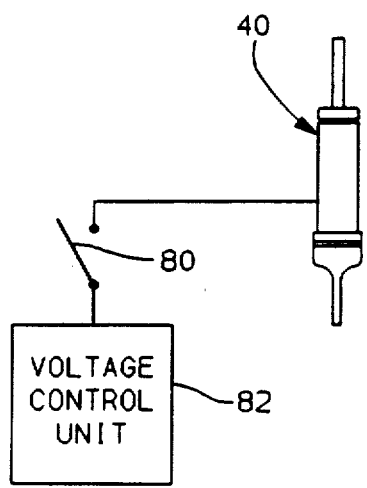

An electrical circuit is provided and attached to the cylinder 44 to subject the electro-rheological fluid 74 to a voltage. The circuit is shown in FIG. 4 and includes a seat adjuster switch 80 which is connected to a voltage control unit 82. The seat adjuster switch 80 is closed when the seat is not adjusting. The voltage control unit 82 conducts a voltage to the electro-rheological fluid of the extensible cylinder 40 whenever the seat switch 80 is closed. The application of voltage to the electro-rheological fluid causes the water to be expelled from the particles and act as an adhesive agent making the particles congeal together. As a result, the electro-rheological fluid is a solid which prevents flow of the fluid through the orifices 70 so that the piston 62 is locked against movement within the cylinder 44. Accordingly the imposition of any seat belt load on the cylinder is transmitted through the extensible cylinder 40 into the vehicle floor.

When the occupant energizes the seat adjuster to adjust the position of the seat, the switch 80 is opened which in turn causes the voltage control unit 82 to terminate the conduction of voltage to the electro-rheological fluid so that the fluid liquefies and is able to flow freely through the orifices 70 so that the extensible cylinder is free to extend and retract with the adjusting movement of the seat.

It will be appreciated that the orifices 70 may be sized to permit the solidified electro-rheological fluid to be extruded through the orifices upon the imposition of a certain predetermined level of occupant impact load. In this manner, the extensible cylinder assembly 40 may act as an energy absorber to permit limited and controlled forward excursion of the seat.

Thus it is seen that the invention provides a new and improved mechanism for transferring an occupant restraint load from a vehicle seat to the vehicle floor.

The embodiments of the invention in which an exclusive property or privilege is claimed are defined as follows:

1. In a motor vehicle having a seat mounted on the floor by a seat adjuster and a seat belt for restraining an occupant in the seat, the improvement comprising:
   means mounting the seat belt on the seat for movement with the seat upon adjusting movement of the seat,
   and an extensible cylinder extending between the means mounting the seat belt and the vehicle floor for transmitting loads imposed on the seat belt to the vehicle floor, said extensible cylinder including a piston movable within a cylinder to permit extension of the extensible cylinder during adjusting movement of the seat and having electro-rheological fluid filling the cylinder, said electro-rheological fluid having a solid state when a voltage is applied thereto to lock the position of the piston within the cylinder and against extension to transmit the occupant restraining load to the vehicle floor and a fluid state in the absence of voltage applied thereto so that the piston may move freely through the electro-rheological fluid to extend and retract the extensible cylinder, and circuit means effective to apply voltage to the electro-rheological fluid when the seat adjuster is not being adjusted and to interrupt the application of voltage when the seat is being adjusted.

2. In a motor vehicle having a seat mounted on the floor by a seat adjuster and a seat belt for restraining an occupant in the seat, the improvement comprising:
   means mounting the seat belt on the seat for movement with the seat upon adjusting movement of the seat,
   electrically energizeable motor means associated with the seat adjuster for adjusting the seat position,
   an extensible cylinder extending between the means mounting the seat belt and the vehicle floor, said extensible cylinder including a piston having associated orifice means and electro-rheological fluid filling the cylinder and flowing through the orifice means upon extension and retraction of the extensible cylinder during adjusting of the seat,
   and electrical circuit means effective to apply voltage to the electro-rheological fluid only when the seat adjuster is not electrically energized so that the electro-rheological fluid has a solid state to lock the position of the piston within the cylinder and against extension to transmit the occupant restraining load to the vehicle floor and a fluid state in the absence of said voltage being communicated thereto so that the piston may move freely through the electro-rheological fluid to extend and retract the extensible cylinder during adjusting movement of the seat.

3. The combination of claim 2 further characterized by said orifice means being sized to permit extruded flow of the solidified electro-rheological fluid therethrough upon the imposition of a predeterminedly high level of belt load thereon so to provide energy absorbing extension of the piston within the cylinder.

* * * * *